(12) United States Patent
Harlow

(10) Patent No.: US 9,557,633 B2
(45) Date of Patent: Jan. 31, 2017

(54) DISPLAY APPARATUS

(71) Applicant: ESP Technologies Group Limited, Aylesford (GB)

(72) Inventor: Philip Harlow, Aylesford (GB)

( * ) Notice: Subject to any disclaimer, the term of this patent is extended or adjusted under 35 U.S.C. 154(b) by 0 days.

(21) Appl. No.: 14/888,251

(22) PCT Filed: Apr. 28, 2014

(86) PCT No.: PCT/GB2014/051316
§ 371 (c)(1),
(2) Date: Oct. 30, 2015

(87) PCT Pub. No.: WO2014/177849
PCT Pub. Date: Nov. 6, 2014

(65) Prior Publication Data
US 2016/0062225 A1    Mar. 3, 2016

(30) Foreign Application Priority Data
Apr. 30, 2013    (GB) .................................. 1307776.3

(51) Int. Cl.
| | | |
|---|---|---|
| *G03B 21/62* | (2014.01) | |
| *B41M 5/035* | (2006.01) | |
| *G02B 1/04* | (2006.01) | |
| *G02B 1/10* | (2015.01) | |
| *G02B 3/08* | (2006.01) | |
| *G02B 5/02* | (2006.01) | |
| *G03B 21/625* | (2014.01) | |

(52) U.S. Cl.
CPC .............. *G03B 21/62* (2013.01); *B41M 5/035* (2013.01); *G02B 1/04* (2013.01); *G02B 1/10* (2013.01); *G02B 3/08* (2013.01); *G02B 5/0278* (2013.01); *G03B 21/625* (2013.01)

(58) Field of Classification Search
CPC ................................. G03B 21/56; G03B 21/60
USPC ......................................... 359/450, 453, 460
See application file for complete search history.

(56) References Cited

U.S. PATENT DOCUMENTS

| | | | | |
|---|---|---|---|---|
| 3,016,794 A | * | 1/1962 | Crandon ................ | G03B 21/56 156/304.4 |
| 3,251,264 A | * | 5/1966 | Jacobson ............... | G03B 21/60 160/24 |
| 3,832,031 A | * | 8/1974 | Land ...................... | G03B 21/62 359/460 |
| 4,053,208 A | * | 10/1977 | Kato .................... | G03B 21/625 359/460 |
| 4,083,626 A | * | 4/1978 | Miyahara ............. | G03B 21/625 359/453 |
| 6,848,795 B2 | * | 2/2005 | Kaminsky ............. | B41M 3/008 353/120 |

(Continued)

OTHER PUBLICATIONS

Written Opinion issued in PCT Priority Application serial No. PCT/GB2014/051316 dated Nov. 3, 2015.

*Primary Examiner* — Christopher Mahoney
(74) *Attorney, Agent, or Firm* — Haugen Law Firm PLLP

(57) ABSTRACT

A display apparatus for use with a rear projection system, the apparatus including a translucent fabric substrate having a front surface and a rear surface, the front surface of the substrate including a print area which carries thereon one or more printed images and a projected image area which is substantially devoid of printed images; and a diffusion layer arranged such that the projected image area of the substrate is capable of displaying a rear projected image thereon.

20 Claims, 1 Drawing Sheet

(56) References Cited

U.S. PATENT DOCUMENTS

Figure 1:
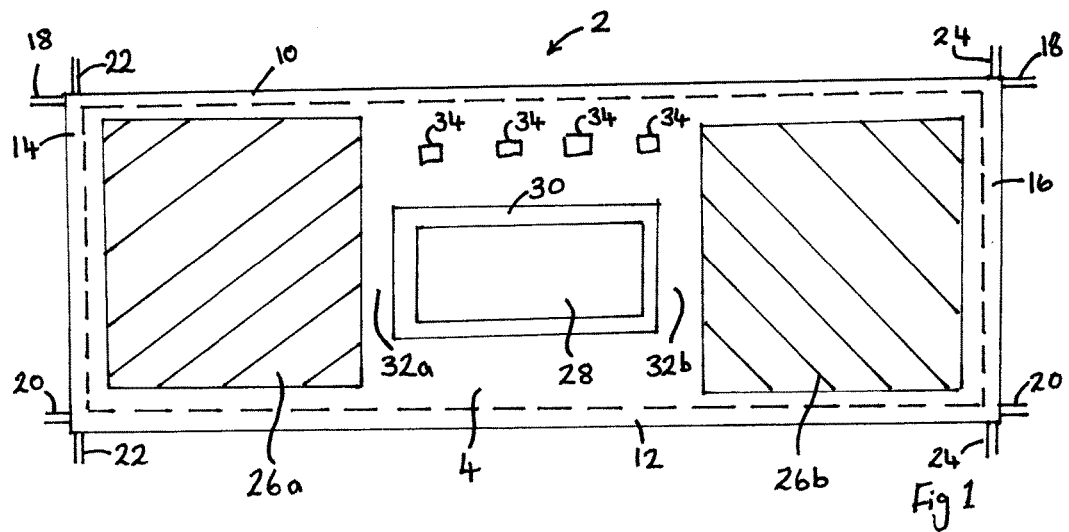

| | | | |
|---|---|---|---|
| 6,981,350 B1 * | 1/2006 | Redmon | G09F 15/0062 359/443 |
| 2003/0214711 A1 * | 11/2003 | Turner | G02B 27/2292 359/450 |
| 2008/0174865 A1 | 7/2008 | Stewart | |
| 2010/0053748 A1 * | 3/2010 | Rohner | G03B 21/62 359/460 |
| 2012/0206661 A1 * | 8/2012 | Risher | G03B 21/56 348/789 |
| 2014/0347724 A1 * | 11/2014 | Schultz | G03B 21/62 359/450 |
| 2015/0348304 A1 * | 12/2015 | Kawash | G03B 21/62 345/588 |

\* cited by examiner

DISPLAY APPARATUS

The present invention is concerned with a display apparatus for use as a stage set and/or a backdrop for presentation or display purposes.

Backdrops or presentation/display sets are required in a range of applications, including for use in theatre presentations as well as conference or exhibition presentations and displays. For example, in a presentation, such as a conference presentation, it is often necessary to have an appropriate backdrop behind a presenter or speaker, showing appropriate images and/or information. In recent years, technology has advanced to present extremely professional looking presentation backdrops providing a variety of information and/or images.

A range of stage sets are currently in use. Conventional solid stage sets are generally produced using a timber frame and sheet timber cladding, with, for example, fabric, paint or other finishes applied to the visible surfaces. These solid sets can be painted or provided with printed images or the like as permanent images for the backdrop. In addition, this type of set can be provided with apertures to which or in which projection surfaces can be fitted or arranged to allow presentation content to be projected either by rear projection onto the projection surfaces or front projection. The permanent (painted, printed, etc.) features of the set can be enhanced by lighting. Generally, front lighting is used to highlight and illuminate features of the set, for example, to accentuate depth and form.

Solid stage sets are, however, made up of bulky and heavy timber components which require correspondingly large storage spaces and transport options. In addition, the sets need to be constructed at the venue, which requires a skilled installation crew, and corresponding construction time and cost. Similarly, the installation needs to be taken down (de-rigged) after use by a skilled crew and appropriately transported and stored. The stage sets are, essentially, purpose built and designed and have limited re-use possibilities.

The present invention sets out to address and/or ameliorate at least some of the problems associated with existing stage sets.

According to a first aspect of the invention, there is provided a display apparatus for use with a rear projection system, the apparatus including a translucent fabric substrate having a front surface and a rear surface, the front surface of the substrate including a print area which carries thereon one or more printed images and a projected image area which is substantially devoid of printed images; and a diffusion layer arranged such that the projected image area of the substrate is capable of displaying a rear projected image thereon. Thus, at least the projected image area includes the diffusion layer.

Suitably, substantially all of the fabric substrate carries the diffusion layer. For example, the fabric substrate may include a diffusion layer over its entire surface.

The subject apparatus is quicker and easier to erect than a conventional hard screen apparatus and does not require two or more separate fabric components where one of the fabric is printed to form the print area and a different fabric includes a diffusion layer to enable it to function as a rear projection screen, thereby providing the projected image area. Thus a complete display apparatus or back-drop may be formed from a single sheet of fabric material.

The translucent fabric substrate suitably transmits visible light. The amount of light transmitted is usually expressed as a percentage of the incident light which passes through the fabric. In the case of the translucent fabric of the present invention, this suitably has a visible light transmission of at least 10%. This allows the fabric to function as a rear projector screen, i.e. it enables it to display images projected onto the rear of the fabric. Suitably, the visible light transmission of the fabric is at least 15%, at least 20%, at least 25%, at least 30%, at least 40%, at least 50%, at least 60%, at least 70%, at least 75%, at least 80%, at least 85%, at least 90%, at least 95% or at least 98%.

In addition to being translucent, the fabric substrate also has a front surface that accepts colourants to provide a print area having printed thereon one or more images. The fabric substrate may be formed from a material that inherently accepts colourants or it may include a coating on its front surface that is adapted to accept colourants. Thus, the front face of the fabric may be uncoated or it may include a colourant-accepting coating. The colourant-accepting coating may be carried by the print area or it may be applied to the entire fabric substrate.

The fabric substrate may comprise a woven fabric or a non-woven fabric. In the context of the present invention, non-woven fabrics include, but are not limited to knitted fabrics. Furthermore, the fabric substrate may be formed from a single sheet of woven or non-woven fabric or it may be formed as a laminate of two of more fabric sheets. In the case of laminated fabric substrates, the individual sheets may be the same or different. In particular, for laminates, each individual sheet may be a woven fabric or a non-woven fabric.

The fabric substrate may include a polyester fabric sheet, which may be woven or non-woven. In embodiments using a polyester or polyester-based fabric sheets, it may be desirable to use aqueous colourant systems, such as aqueous inks and aqueous dyes to avoid undesired chemical reactions between the fabric material and non-aqueous solvents. It will be appreciated that an "aqueous colourant system" is a colourant system in which the colourant material is carried by an aqueous carrier.

The diffusion layer is suitably located at the rear of the fabric, for example adjacent to the rear face of the fabric substrate. Thus, a rear surface of the fabric substrate may carry the diffusion layer. However, in the case of a laminated fabric, this includes being located at the rear of the front sheet. In other words, in the case of laminated fabrics, the diffusion layer may be located between two of the sheets forming the laminate.

The diffusion layer (or light diffusing layer) diffuses the light striking it from the projector in a controlled manner. It needs to diffuse the light sufficiently that "hot spots" are avoided. It will be appreciated by those skilled in the art of rear projection screens that hot spots are where the light from the rear projector is visible through the projected image area in the form of a relatively bright image in the centre of the image area and a decrease in the brightness of the image with distance from the centre. However, the diffusion layer also needs not to diffuse or scatter the incident light too much that the resultant image is blurred. Thus, a suitable diffusion layer is able to produce an image which is clear to a viewer in front of the apparatus with little or no hot spot in the image. In other words, the diffusion layer should provide an acceptably clear image with substantially consistent brightness across the image.

The diffusion layer may be a coating or it may be in the form of a sheet or film. Thus, the fabric substrate of the present invention may include a diffusion layer coated onto the substrate, suitably the rear of the substrate; or it may include a diffusion layer in the form of a sheet or film secured to the substrate (suitably the rear of the substrate) to form a laminate. In embodiments in which the diffusion layer is secured to the substrate, it may be adhered to the substrate or it may be heat laminated to the substrate.

To achieve a very high quality projected image (compared with a good quality image or acceptable quality image), the diffusion layer may be configured or arranged in the form of a Fresnel lens. This may be achieved by forming ridges or steps in the diffusion layer to focus the light from the projector through the fabric substrate.

Whether in the form of a coating or a sheet or film, the diffusion layer is suitably formed from a polymeric material, such as an acrylic polymer or an acrylic co-polymer.

The print area of the fabric substrate may be spaced from the projected image area such that the printed images are capable of being illuminated (from behind or in front) without interference with a rear projected image projected onto the projected image area. It is known that illumination provided close to, or overlapping with, a projected image can "wash out" the projected image by decreasing the intensity of the image and making it appear less bright than it would appear without the interfering illumination. By providing a gap between the print area and the projected image area, it is possible to reduce the overlap or interference from a light source arranged to illuminate the print area.

In an embodiment of the invention, the front surface of the fabric substrate includes a border of substantially opaque material surrounding the projected image area. Such a border assists in distinguishing the projected image area from the print area. It also assists lighting technicians and projection specialists to direct the projected image and the illumination of the print area in such a way that the interference is minimised. The opaque material is suitably printed onto the front surface of the fabric substrate and may be formed from dark coloured or black inks, tonors, dyes or other colourant materials. Suitably, the opaque border is printed using inks or dyes.

In addition to the print area and the projected image area, it is often desirable to add three dimensional elements to a display apparatus or back-drop. This may be achieved by providing a fabric substrate as defined anywhere herein, wherein the fabric substrate carries one or more magnetic elements. Such magnetic elements permit components containing a ferromagnetic or paramagnetic element to be releasably coupled to the substrate. These magnetically coupled components are capable of forming temporary additions to the substrate and may provide an aesthetically pleasing three-dimensional visual impact.

Display apparatus and/or back-drops are often used repeatedly and may become soiled over time. It would therefore be advantageous to be able to clean the apparatus. Accordingly, in an embodiment of the invention, the fabric substrate is washable. Suitably, the fabric substrate may be washed using either a domestic or industrial washing machine. In this embodiment, the fabric of the fabric substrate, the printed images and the diffusion layer are all not significantly degraded by water and relatively mild detergents. In the context of a washable fabric substrate according to the invention, the substrate may include washing instructions which specify that only certain detergents should be used to wash the fabric substrate.

Most display apparatus and back-drops are arranged vertically. Accordingly, the fabric substrate may include or define one or more suspension elements that permit the substrate to be arranged vertically. The substrate may define one or more elongate sleeves or channels into which suspension poles or rods may be inserted. Such sleeves or channels may be formed at a peripheral edge portion of the substrate, in particular, along the top edge portion of the fabric substrate. Thus, the substrate fabric may include one or channels adapted to receive therein a respective scaffold element such that in use, the scaffold elements are supported and the scaffold elements in turn support the substrate. It will be appreciated that reference herein to relative positions, such as "top", "bottom", "side", etc. refer to the fabric substrate when arranged for normal use. Thus, the term "top" refers to the uppermost portion of the substrate when the substrate is arranged for normal use.

Additionally or alternatively, the substrate may include or define one or more apertures through which suspension elements such as ropes or wires may pass. These may be in the form of reinforced eyelets punched through the substrate. The substrate may be suspended in a vertical plane via one or more suspension ropes, wires or cables passing through respective apertures formed in or defined by the substrate.

Suitably, the printed images on the print area of the fabric substrate may be printed by any convenient process. Thus conventional aqueous or organic inks or pigments may be used. However, in an embodiment of the invention, the or each printed image is dyed into the front surface of the fabric substrate via dye sublimation printing. Dye sublimation printing can achieve excellent depth and clarity of colour on the substrate.

In a further embodiment of the invention, the images are printed onto the substrate in such a way that they provide a three-dimensional visual effect. This effect may be enhanced by appropriate illumination of the images.

Fabric substrates used in public areas may need to satisfy local laws regarding their ability to resist fire and burning. In this context, the fabric substrate may include a fire retardant material. The fire retardant material may be impregnated into the fabric of the fabric substrate or it may be carried by a fire retardant layer which is coated or laminated onto the substrate. In an embodiment of the invention, the diffusion layer may include a fire retardant material. Thus, the diffusion layer and the fire retardant layer may be a single common layer.

According to a second aspect of the invention, there is provided a method of preparing a display apparatus according to any of claims 1 to 16, the method including:
  i. providing a fabric substrate having a front surface and a rear surface, wherein the substrate carries thereon a diffusion layer;
  ii. defining a print area on the front surface of the substrate;
  iii. defining a projected image area on the front surface of the substrate, the projected image area being spaced from the print area; and
  iv. printing one or more images on the print area.

Suitably, the diffusion layer is carried by the rear surface of the substrate. The substrate may be as defined anywhere hereinabove. The diffusion layer may be provided across the entire surface of the fabric substrate.

The method may further include the step of providing a border of substantially opaque material surrounding the projected image area.

As mentioned above, the step of printing one or more images on the print area may include printing the images via dye sublimation printing.

In embodiments in which the fabric substrate includes one or more magnetic elements, the method may include the further step of securing one or more magnetic elements to the fabric substrate.

In order to be able to suspend the fabric substrate vertically, the method may further include the step of forming in the substrate or securing to the substrate one or more suspension elements. The suspension elements may be in the form of one or more elongate channels or sleeves, suitably arranged at a peripheral edge portion of the substrate.

The skilled person will appreciate that the features described and defined in connection with the aspects of the invention and the embodiments thereof may be combined in any combination, regardless of whether the specific combination is expressly mentioned herein. Thus, all such combinations are considered to be made available to the skilled person.

Figure 2:
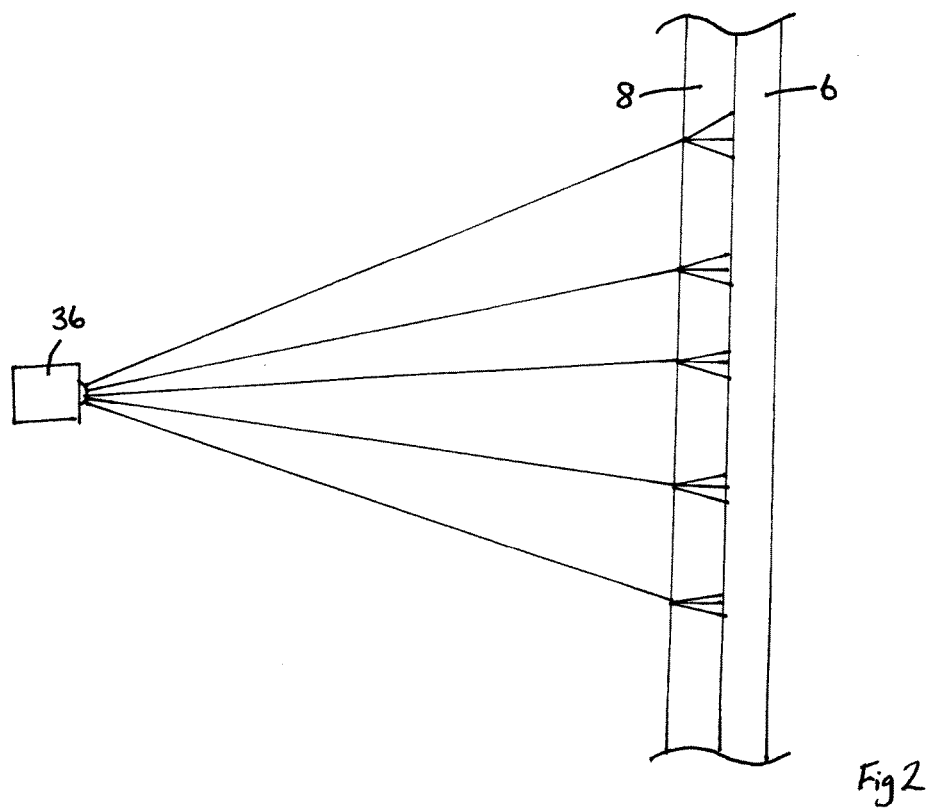

An embodiment of the invention will now be described, by way of example only, with reference to the accompanying drawings in which:

FIG. 1 is a front elevational view of a display apparatus according to the invention; and FIG. 2 is a schematic representation through a section of the apparatus in use.

For the avoidance of doubt, the skilled person will appreciate that in this specification, the terms "up", "down", "front", "rear", "upper", "lower", "width", etc. refer to the orientation of the components as found in the example when installed for normal use as shown in the Figures.

FIG. 1 shows a display apparatus 2 comprising a fabric substrate 4. The substrate 4 comprises a sheet of fabric material 6 which has coated on its rear surface an Acrylic/polyethylene copolymer coating 8 (see FIG. 2). The fabric material 6 is a polyester material having a weight of 165 g/m2 and which is available as 7019LUXX from Georg and Otto Friedrich. Without wishing to be bound by theory, the polymeric coating fills the holes and voids in the fabric sheet 6 and acts as a visible light diffusion layer.

The substrate 4 is configured such that elongate channels are formed around the periphery of the substrate 4. Thus, the substrate 4 provides a top channel 10, a bottom channel 12, a left side channel 14 and a right side channel 16. Scaffold elements are located within the channels and are sized such that a portion of each scaffold element extends beyond the ends of each respective channel. As can be seen from FIG. 1, a top scaffold element 18 is located within the top channel 10, a bottom scaffold element 20 is located within the bottom channel 12, a left scaffold element 22 is located within the left side channel 14 and a right scaffold element 24 is located within the right side channel 16.

The scaffold elements 18, 20, 22, 24 provide a frame for the fabric substrate which maintains it in a taught configuration in use. The scaffold elements are suspended in use, which in turn suspends the substrate.

The fabric defines two print areas 26a and 26b on which is printed desired images or indicia. In this embodiment, the images or indicia are printed via an aqueous based dye sublimation process which results in a dyed fabric. The polyester fabric sheet 6 used in the substrate 4 is compatible with this type of printing technique. However, any print techniques could be used to print the images or indicia on the print areas 26a, 26b, provided that a compatible fabric sheet is used in the substrate.

Spaced from the print areas 26a, 26b is defined a projected image area 28. The projected image area 28 is surrounded by an opaque border 30. Gaps 32a, 32b are defined between the border 30 and the print areas 26a, 26b. The gaps 32a, 32b allow the printed images in the print areas 26a, 26b to be illuminated (either from in front or behind) without interfering with (e.g. washing out) the image projected onto the projected image area 28.

The fabric substrate 4 further includes a number of magnetic elements 34 secured thereto. Four magnetic elements 34 are shown in FIG. 1, but any number could be provided. Furthermore, the magnetic elements 34 are shown located above the projected image area 28, but the skilled person will appreciate that they could be located anywhere on the substrate as desired.

FIG. 2 shows a schematic representation of a cross-section of the fabric substrate 4. A projector 36 is located at the rear of the fabric substrate and the images projected onto the rear surface of the fabric substrate 4 are focussed to the projected image area 28. The light from the projector 36 strikes the polymeric coating 8 and the scattering of the light is controlled such that it is mainly directed though the fabric sheet 6. The controlled scattering of the light results in a relatively sharp, well-defined image being projected onto the projected image area 28. Without the polymeric coating 8 on the fabric sheet 6, it is believed that the light scatter would be significantly greater which would reduce the quality of the image seen by a viewer to an extent that the substrate 4 would not function as a rear projection screen, and in more extreme cases, the image would be so blurred as to be non-recognisable.

The invention claimed is:

1. A display apparatus for use as a stage set or backdrop for presentation or display purposes, the apparatus including a translucent polyester fabric substrate having a front surface, a rear surface and a light transmission of at least 10%, the front surface of the substrate including a print area which carries thereon one or more printed images formed from a dye sublimated media, and a projected image area which is substantially devoid of printed images; and a diffusion layer provided on the rear of the substrate such that the projected image area of the substrate is capable of displaying a rear projected image thereon, wherein the polyester fabric substrate is machine washable.

2. A display apparatus according to claim 1, wherein the print area is spaced from the projected image area such that printed images are capable of being illuminated without interference with a rear projected image projected onto the projected image area.

3. A display apparatus according to claim 1, wherein the diffusion layer is coated onto the rear surface of the fabric substrate.

4. A display apparatus according to claim 1, wherein the diffusion layer is laminated onto the rear surface of the fabric substrate.

5. A display apparatus according to claim 1, wherein at least a part of the diffusion layer is configured to form a Fresnel lens.

6. A display apparatus according to claim 1, wherein the diffusion layer is formed from a polymeric material.

7. A display apparatus according to claim 6, wherein the polymeric material is an acrylic polymer or co-polymer.

8. A display apparatus according to claim 1, wherein the front surface includes a border of substantially opaque material surrounding the projected image area.

9. A display apparatus according to claim 1, wherein the substrate further carries one or more magnetic elements which permit components containing a ferromagnetic or paramagnetic element to be releasably coupled to the substrate.

10. A display apparatus according to claim 1, wherein the fabric substrate includes or defines one or more suspension elements that permit the substrate to be arranged vertically.

11. A display apparatus according to claim 10, wherein the or each suspension element includes an elongate channel formed at a peripheral edge portion of the substrate.

12. A display apparatus according to claim 11, wherein the or each channel is adapted to receive therein a scaffold element such that in use the scaffold element when supported will support the fabric substrate.

13. A display apparatus according to claim 1, wherein the fabric substrate further includes a fire retardant material.

14. A display apparatus according to claim 1, wherein the or each printed image is printed directly onto the polyester fabric substrate.

15. A method of preparing a display apparatus according to claim 1, the method including:
   i. providing the machine washable polyester fabric substrate having a front surface and a rear surface, wherein the substrate carries thereon a diffusion layer on its rear surface;
   ii. defining the print area on the front surface of the substrate;
   iii. defining the projected image area on the front surface of the substrate, the projected image area being spaced from the print area; and
   iv. printing one or more images on the print area via a dye sublimation process.

16. A method according to claim 15, wherein the method further includes the step of providing a border of substantially opaque material surrounding the projected image area.

17. A method according to claim 15, wherein the method further includes the step of securing one or more magnetic elements to the fabric substrate.

18. A method according to claim 15, wherein the method further includes the step of forming in the substrate or securing to the substrate one or more suspension elements.

19. A method according to claim 18, wherein the step of forming one or more suspension elements in the substrate includes forming one or more elongate channels at a peripheral edge portion of the substrate.

20. A system for simultaneous display of projected images and printed images or indicia, said system comprising:
   a display apparatus including a substrate with a machine washable polyester fabric sheet having a front surface, a rear surface, and a visible light transmission of at least 10%, and a visible light diffusion layer on the rear surface of the polyester fabric sheet, a front side of the substrate including a print area which carries thereon one or more printed images formed from a dye sublimated media, and a projected image area which is substantially devoid of printed images, the print area being spaced from the projected image area by a gap, wherein the visible light diffusion layer is capable of diffusing visible light to an extent suitable to display a projected image at the projected image area; and
   a projector positioned to project visible light images onto a rear side of the substrate, opposite to the front side of the substrate.

* * * * *